United States Patent
Imagawa

(10) Patent No.: US 8,223,602 B2
(45) Date of Patent: Jul. 17, 2012

(54) OPTICAL DISC DRIVE

(75) Inventor: Seiji Imagawa, Tokyo (JP)

(73) Assignees: Hitachi, Ltd., Tokyo (JP); Hitachi-LG Data Storage, Inc., Tokyo (JP)

(*) Notice: Subject to any disclaimer, the term of this patent is extended or adjusted under 35 U.S.C. 154(b) by 1072 days.

(21) Appl. No.: 11/652,938

(22) Filed: Jan. 11, 2007

(65) Prior Publication Data
US 2007/0274166 A1 Nov. 29, 2007

(30) Foreign Application Priority Data
May 23, 2006 (JP) ................................. 2006-142230

(51) Int. Cl.
G11B 7/00 (2006.01)
G11B 27/36 (2006.01)
G11B 11/00 (2006.01)

(52) U.S. Cl. ............... 369/44.32; 369/44.23; 369/44.24; 369/44.28

(58) Field of Classification Search .............. 369/44.23, 369/110.02, 44.24, 44.32, 120, 44.28
See application file for complete search history.

(56) References Cited

U.S. PATENT DOCUMENTS

| | | | |
|---|---|---|---|
| 5,444,687 A | 8/1995 | Okumura | |
| 7,768,880 B2 * | 8/2010 | Sagara | 369/44.23 |
| 2002/0187765 A1 * | 12/2002 | Kozak et al. | 455/232.1 |
| 2004/0218484 A1 * | 11/2004 | Kuze et al. | 369/44.23 |
| 2005/0047310 A1 * | 3/2005 | Kan | 369/112.01 |
| 2007/0097809 A1 * | 5/2007 | Miyaoka | 369/44.23 |
| 2008/0285408 A1 | 11/2008 | Fujiune et al. | |

FOREIGN PATENT DOCUMENTS

| | | |
|---|---|---|
| JP | 06-12785 A | 1/1994 |
| JP | 2000-298833 A | 10/2000 |
| JP | 2001-229564 A | 8/2001 |
| JP | 2003-257045 A | 9/2003 |
| JP | 2005-108334 | 4/2005 |
| WO | WO2006/001327 A1 | 1/2006 |

OTHER PUBLICATIONS

China State Intellectual Property Office (SIPO) office action for SIPO patent application 200710078821.7 (May 9, 2008).
Japan Patent Office office action for patent application JP2006-142230 (Jun. 22, 2010).
Japan Patent Office office action for patent application JP2006-142230 (Mar. 1, 2011).

* cited by examiner

*Primary Examiner* — Wayne Young
*Assistant Examiner* — Dionne Pendleton
(74) *Attorney, Agent, or Firm* — Kilpatrick Townsend & Stockton LLP

(57) ABSTRACT

With a high-density optical disc drive, although it is necessary to correct spherical aberrations which depend on a disc substrate thickness error, operation of an aberrations correction element takes time and therefore easy correction according to a disc radius degrades the operability of the apparatus. The present invention comprises an optical pickup unit including an objective lens and an aberrations correction lens, a focus actuator, a tracking actuator, a aberrations correction motor, a seek motor, an aberrations correction lens control module, a radius information detecting module, and a system control module.

8 Claims, 7 Drawing Sheets

(a)

(b)

(a)

Zone: n-1, n, n+2

(b)

Zone n, Zone n+1, (1), (2), (3), Target position, Optical pickup unit, 7

(a)

(b)

OPTICAL DISC DRIVE

BACKGROUND OF THE INVENTION

The present invention relates to an optical disc drive.

A background art of the present technical field is disclosed, for example, in Japanese Patent Laid-open No. 2005-108334. The above-mentioned patent gazette describes "providing an apparatus which corrects spherical aberrations caused by a difference between discs" as an object and "performing writing or reading by controlling a spherical aberrations control mechanism based on control signal data by radius position stored in a storage means" as a solving means.

SUMMARY OF THE INVENTION

With a high-density optical disc, although numerical aperture is increased as a means for improving the recording density, it becomes impossible to ignore an effect of spherical aberrations caused by a disc cover layer thickness error. The disc cover layer thickness means a layer between a disc surface and an information side or a space layer between information sides of a multilayer disc. Therefore, control of a high-density optical disc is such that spherical aberrations may be reduced according to a disc cover layer thickness error by use of a spherical aberrations correction element.

A method for correcting such spherical aberrations is disclosed in Patent Reference 1. As shown in Japanese Patent Laid-open No. 2005-108334, a method for changing the amount of spherical aberrations correction according to a disc radius position is effective to ensure optimal read/write performance because the method can reduce spherical aberrations caused by variation in cover layer or space layer thickness in the radial direction of the disc.

However, the spherical aberrations element generally requires time to change the amount of correction, arising a subject that performing frequent correction operation will take much time, resulting in degradation of the operability of an apparatus.

Therefore, an object of the present invention is to provide an optical disc drive having excellent operability.

The above-mentioned object can be accomplished by a configuration described, for example, in Claims.

In accordance with the present invention, it is possible to provide an optical disc drive having excellent operability.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

An embodiment of the present invention will be described below.

Embodiment 1

First, a configuration of an optical disc drive of the present embodiment will be described below with reference to FIG. 1.

Figure 1:
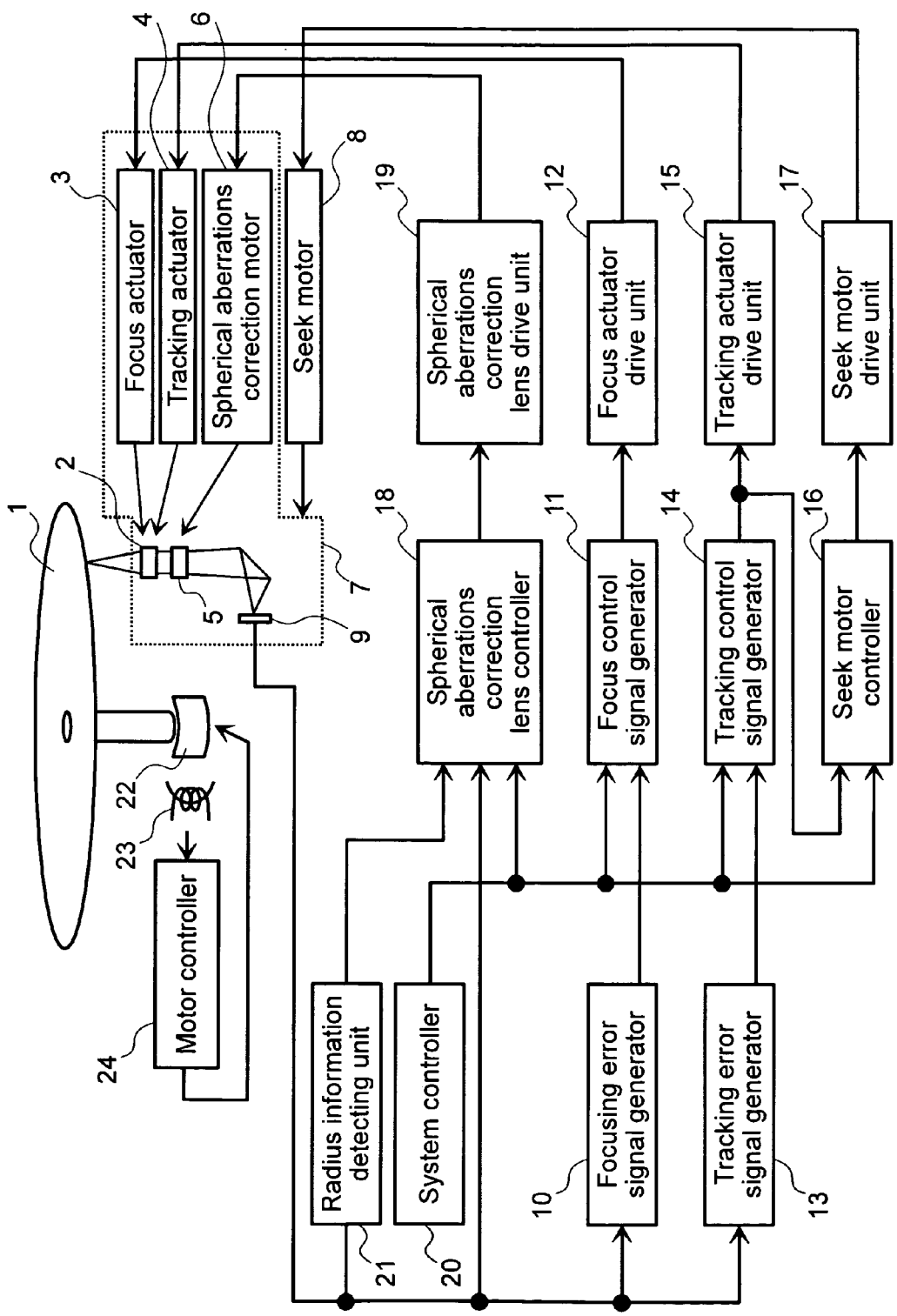
FIG. 1 is a diagram showing components of the present embodiment.

Referring to FIG. 1, the optical disc drive includes a disc 1, an objective lens 2, a focus actuator 3, a tracking actuator 4, a spherical aberrations correction lens 5, and a spherical aberrations correction motor 6. The focus actuator 3 drives the objective lens 2 in the rotating axis direction of the disc 1. The tracking actuator 4 drives the objective lens 2 in the radial direction of the disc 1. The spherical aberrations correction motor 6 drives the spherical aberrations correction lens 5 in the optical axis direction. Further, the optical disc drive includes an optical pickup unit 7, a seek motor 8, a detector 9, a focusing error signal generator 10, a focus control signal generator 11, and a focus actuator drive unit 12. The optical pickup unit 7 includes the objective lens 2 and the spherical aberrations correction lens 5. The seek motor 8 drives the optical pickup unit 7 in the radial direction of the disc 1. The focusing error signal generator 10 generates a signal of error in the focus direction between the disc 1 and the objective lens 2. The focus control signal generator 11 controls the focus actuator 3 so that a focal spot may be positioned on a writing surface or a reading surface of the disc 1. The focus actuator drive unit 12 drives the focus actuator 3. Further, the optical disc drive includes a tracking error signal generator 13, a tracking control signal generator 14, a tracking actuator drive unit 15, a seek motor controller 16, a seek motor drive unit 17, and a spherical aberrations correction lens controller 18. The tracking error signal generator 13 generates a signal of error in the tracking direction between the disc track and the objective lens 2. The tracking control signal generator 14 controls the tracking actuator 3 so that a focal spot may be positioned at a predetermined disc track. The tracking actuator drive unit 15 drives the tracking actuator 3. The seek motor controller 16 controls the seek motor 8. The seek motor drive unit 17 drives the seek motor 8. The spherical aberrations correction lens controller 18 controls the position of the spherical aberrations correction lens 5. Further, the optical disc drive includes a spherical aberrations correction lens drive unit 19, a system controller 20, a radius information detecting unit 21, a spindle motor 22, a frequency generator 23, and a motor controller 24. The spherical aberrations correction lens drive unit 19 drives the spherical aberrations correction lens 5. The system controller 20 manages apparatus conditions and operations and gives operational instructions suitable for the apparatus conditions and operations. The radius information detecting unit 21 detects a disc radius position of the focal spot. The spindle motor 22 rotates the disc 1. The frequency generator 23 generates a signal according to the rotating speed of the spindle motor 22. The motor controller 24 controls the spindle motor 22 to rotate at a predetermined speed.

Operation overview of each block and the relationship between blocks will be described below.

In FIG. 1, the focus actuator 3 moves the objective lens 2 in the rotating shaft direction of the disc, and the tracking actuator 4 moves the objective lens 2 in the radial direction of the disc. Further, the seek motor 8 moves the optical pickup unit 7 in the radial direction of the disc, and the spherical aberrations correction motor 6 moves a spherical aberrations correction lens 5 in the optical axis direction. The detector 9 converts reflected light into an electrical signal and then sends the converted signal to the focusing error signal generator 10, the tracking error signal detecting unit 13, the spherical aberrations correction lens controller 18, and the radius information detecting unit 21. The focusing error signal generator 10 generates a focusing error signal based on the signal sent from the detector 9 and then sends the generated signal to the focus control signal generator 11. The focus control signal generator 11 generates focus control signals based on the signals sent from the focusing error signal generator 10 and the system controller 20 and then sends the generated signal to the focus actuator drive unit 12. The focus control signals mean a feedback control signal for performing feedback control based on the focusing error signal, a focus pull-in control signal for performing feedback control pull-in, and a focus jump control signal. The focus actuator drive unit 12 drives the focus actuator 3 based on the signal sent from the focus control signal generator 11. The tracking error signal generator 13 generates a tracking error signal based on the signal sent from the detector 9 and then sends the generated signal to the tracking control signal generator 14. The tracking control signal generator 14 generates tracking control signals based on the signals sent from the tracking error signal generator 13 and the system controller 20 and then sends the generated signal to the tracking actuator drive unit 15 and the seek motor controller 16. The tracking control signals mean a feedback control signal for performing feedback control based on the tracking error signal and a seek-and-tracking-jump control signal. The tracking actuator drive unit 15 drives the tracking actuator 4 based on the signal sent from the tracking control signal generator 14. The seek motor controller 16 generates a seek motor control signal based on the signals sent from the system controller 20 and the tracking control signal generator 14 and then sends the generated signal to the seek motor drive unit 17. The seek motor drive unit 17 drives the seek motor 8 based on the signal sent from the seek motor controller 16. The radius information detecting unit 21 calculates information about the radius position of the disc currently irradiated with a focal spot from a physical address of the disc based on the signal sent from the detector 9, then sends the calculated information to the spherical aberrations correction lens controller 18. The spherical aberrations correction lens controller 18 generates a motor control signal for spherical aberrations based on the signals sent from the system controller 20, the detector 9, and the radius information detecting unit 21, and then sends the generated control signal to the spherical aberrations correction lens drive unit 19. The spherical aberrations correction lens drive unit 19 drives the spherical aberrations correction motor 6 based on the signal sent from the spherical aberrations correction lens controller 18. The spindle motor 22 drives a disc 1. The frequency generator 23 converts information about the rotating speed of the spindle motor 22 into an electrical signal and then sends the converted signal to the motor controller 24. The motor controller 24 controls the disc motor 21 based on the signal sent from the frequency generator 23 so that the disc 1 rotates at a predetermined rotating speed.

A spherical aberrations correction method will be described below.

Figure 2:
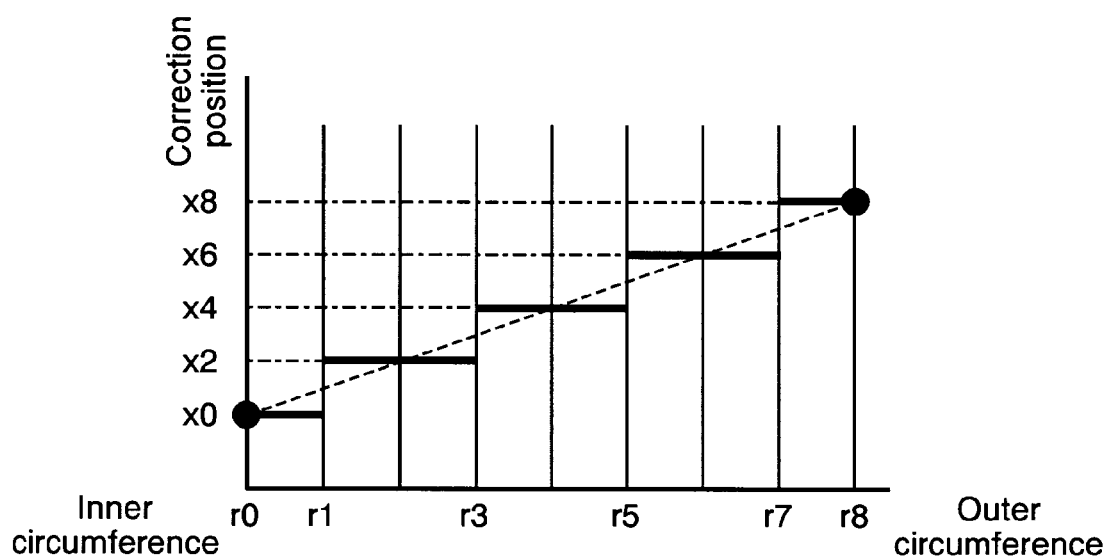
FIG. 2 is a diagram showing an interpolation operation for spherical aberrations correction.
Figure 3:
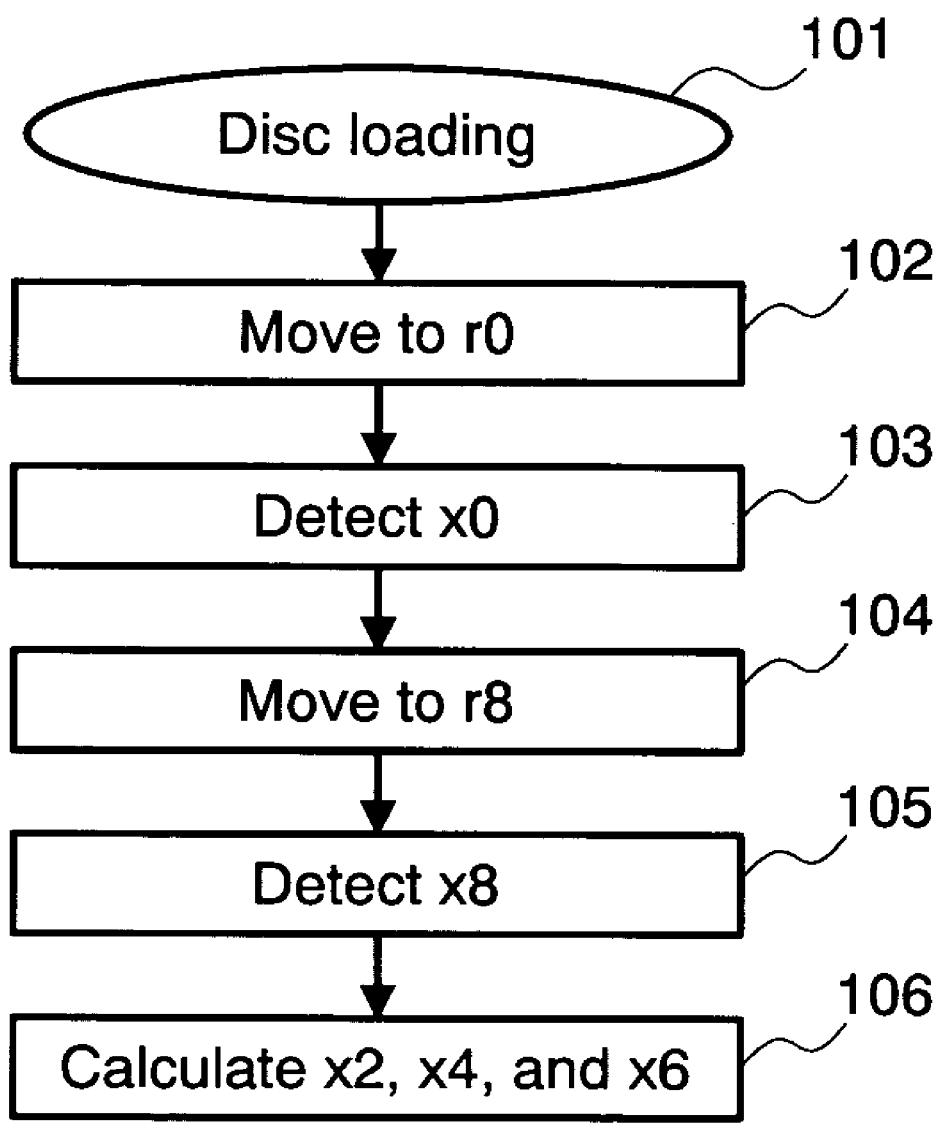
FIG. 3 is a diagram showing a flow chart of an interpolation operation for spherical aberrations correction.

Calculation of a spherical aberrations correction value is performed for each disc insertion during a time interval after the disc is inserted until writing or read operation starts. First, as shown in FIG. 2, the spherical aberrations correction lens controller 18 moves the focal spot to an inner circumference of the disc at a radius position r0, measures a read signal (102 in FIG. 3), and detects the position of the spherical aberrations correction lens 5 at which the read signal is maximized. This position is regarded as an optimal spherical aberrations correction position x0 of the spherical aberrations correction lens 5 in the inner circumference of the disc (103 in FIG. 3). In the same manner, the controller 18 moves the focal spot to an outer circumference of the disc at a radius position r8 (104 in FIG. 3), measures a read signal, and detects the position of the spherical aberrations correction lens 5 at which the read signal is maximized. This position is regarded as an optimal spherical aberrations correction position x8 of the spherical aberrations correction lens 5 in the outer circumference of the disc (105 in FIG. 3). Then, the controller 18 calculates x2, x4 and x6 in each zone, as shown in FIG. 2, by performing linear interpolation of the spherical aberrations correction positions x0 and x8 which have previously been detected with respect to change positions for spherical aberrations correction, r1, r3, r5, and r7, obtained in advance by splitting the disc into eight in terms of the radius (106 in FIG. 3). The change positions r1, r3, r5, and r7 are physical addresses of the disc: r1=PA1, r3=PA3, r5=PA5, and r7=PA7, respectively.

Figure 4:
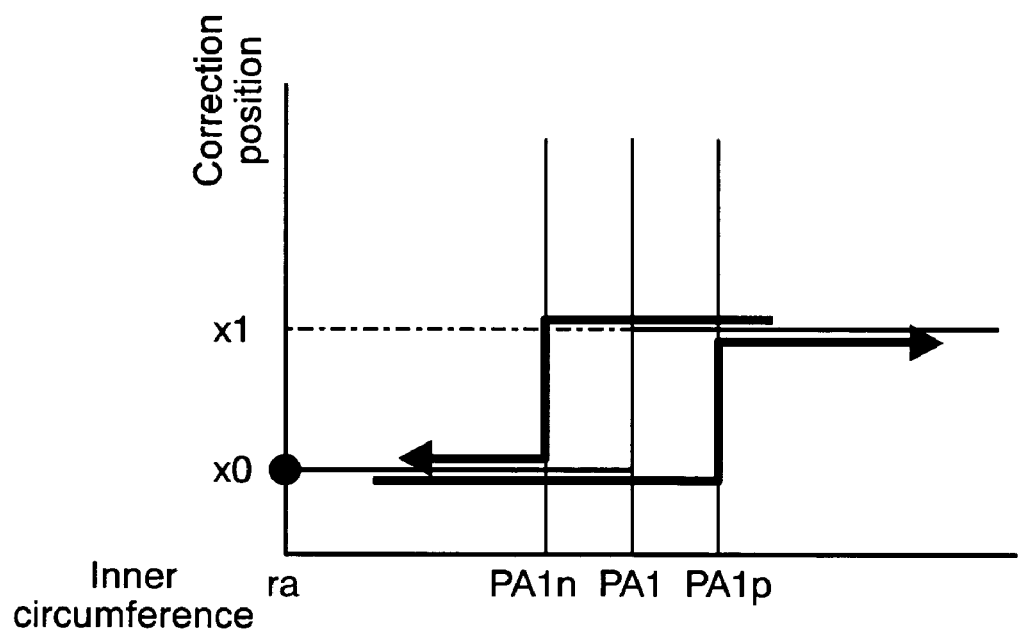
FIG. 4 is a diagram showing a change operation for spherical aberrations correction.

Then, the spherical aberrations correction lens controller 18 minutely changes a change address for spherical aberrations correction according to the moving direction of the focal spot. This is done to prevent the spherical aberrations correction lens from being moved unnecessarily when the focal spot frequently moves within a minute range in verification operation and Walking OPC. Specifically, the change position for spherical aberrations correction is set to either of different values, addresses PA1$n$ and PA1$p$, depending on whether the spot moves from inner to outer circumferences of the disc or vice versa. For example, as shown in FIG. 4, when the focal spot is following up a disc track, the spherical aberrations correction position is changed from x0 to x1 after it exceeds the change address PA1$p$; when the focal spot is moving in the inner circumferential direction because of track jump or the like, the spherical aberrations correction position is changed from x1 to x0 after it exceeds the change address PA1$n$. The addresses PA1$p$ and PA1$n$ are set so that the difference between them is larger than the capacity to be written and read in one cycle so that the spherical aberrations correction lens does not unnecessarily move at the time of verification. When the capacity and the number of the addresses to be written and read in one cycle change according to a disc radius position, the difference between the above-mentioned change addresses (for example, PA1$p$ and PA1$n$) also changes according to the radius.

Figure 5:
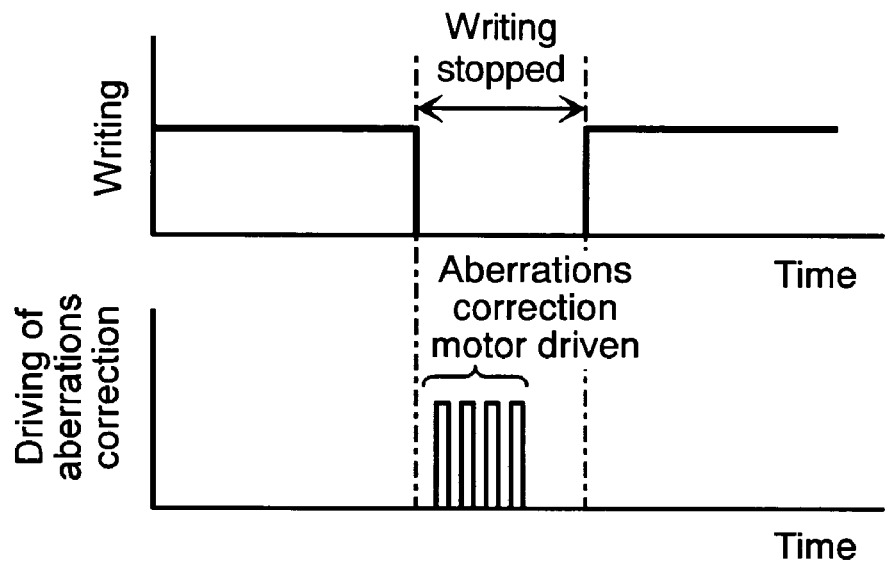
FIGS. 5A and 5B are diagrams showing a change operation for spherical aberrations correction in read/write operation.
Figure 5:
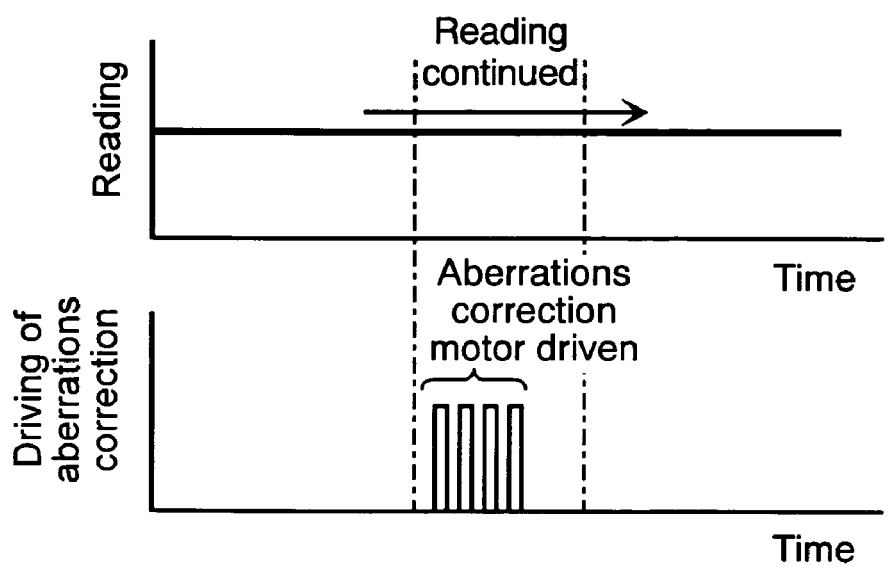

Write, read, and seek operations, and an operation for changing the spherical aberrations correction position will be described below. When a spot reaches the change position PA1$p$ during writing from inner to outer circumferences, write operation is once stopped as shown in FIG. 5A, the aberrations correction motor 6 is driven to change the spherical aberrations correction position from x0 to x1. After that write operation is started. This operation can prevent the degradation of the writing quality due to optical axis shift of the spherical aberrations correction lens 5 involved in driving of the aberrations correction motor 6.

On the other hand, when the spot reaches the change position PA1$p$ during reading from inner to outer circumferences, the aberrations correction motor 6 is driven to change the spherical aberrations correction position from x0 to x1 while continuing read operation as shown in FIG. 5B. This operation can prevent read operation delay. Retrial read operation for reading the relevant address again may cope with the above-mentioned degradation of read performance due to optical axis shift of the spherical aberrations correction lens 5 involved in driving of the aberrations correction motor 6.

Figure 6:
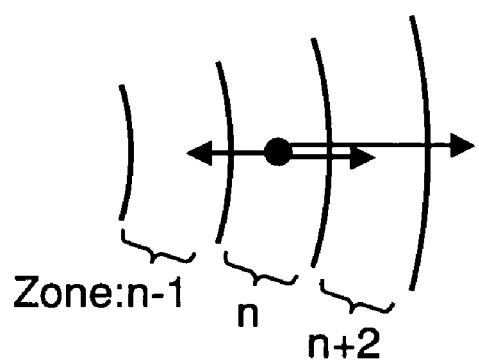
FIGS. 6A and 6B are diagrams showing a change operation for spherical aberrations correction in seek operation.
Figure 6:
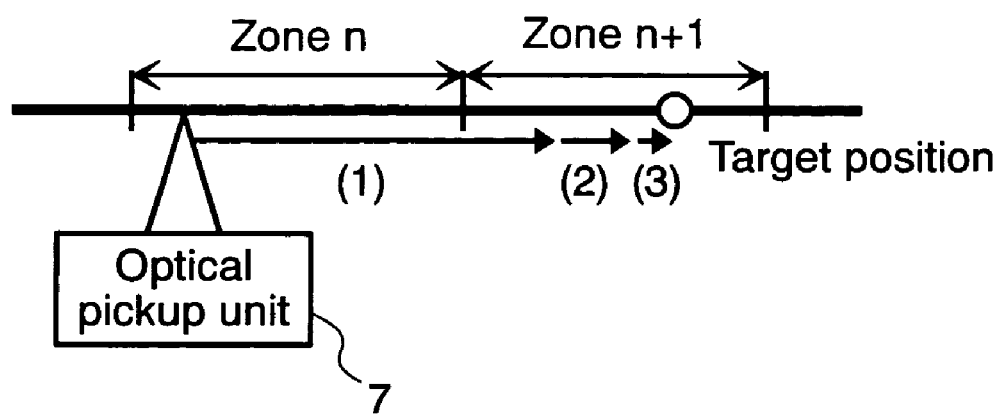

As shown in FIG. 6A, when the spot moves between the above-mentioned zones in seek operation, the spherical aberrations correction lens 5 is changed in position to a spherical aberrations correction position corresponding to a target position during seek operation. For example, (1) in FIG. 6B indicates coarse seek in which the seek motor 8 is driven by a predetermined amount to move the optical pickup unit 7, (2) in FIG. 6B indicates close seek in which the optical pickup unit 7 is driven at a constant speed based on the period of the tracking error signal, and (3) in FIG. 6B indicates track jump in which acceleration and deceleration voltages are applied to the tracking actuator to move the focal spot to a nearby track. It is preferable that the spherical aberrations correction position be changed using (1) coarse seek together, in order not to be affected by the degradation of the tracking error signal due to optical axis shift of the spherical aberrations correction lens 5 during coarse seek.

The present embodiment, when the spot reaches a change position during reading, drives the aberrations correction motor 6 to change the spherical aberrations correction position while continuing read operation, but the present invention is not limited. Specifically, it would be possible that the spherical aberrations correction position for a relevant zone is changed when amplitude reduction of the read signal is detected. It would also be possible that the spherical aberrations correction position for a relevant zone is changed if a data read error or address read error occurs.

The present embodiment calculates information about the radius position of the disc currently irradiated with a focal spot from a physical address of the disc, but the present invention is not limited thereto. Specifically, it would be possible that the radius information detecting unit 21 detects radius information from the moving distance of the seek motor. For example, when the seek motor is a stepping motor, a radius position of the disc can be calculated with the number of drive steps from the reference position with reference to a predetermined inner circumferential position.

The present embodiment performs spherical aberrations correction according to the radius information of the disc without depending on the writing and reading speeds guaranteed for media, but the present invention is not limited thereto. Specifically, with a writing speed of Vw or a reading speed of Vr at which write performance margin or read performance margin against variation in disc substrate thickness can sufficiently be ensured, it would be possible to use a correction value detected in the inner circumference of the disc without performing spherical aberrations correction according to the radius information of the disc. Therefore, depending on a disc used, when the maximum writing speed is Vw or lower and the maximum reading speed is Vr or lower, detection of an optimal spherical aberrations correction position x8 at the above-mentioned outer circumferential position r8 is not performed.

Figure 7:
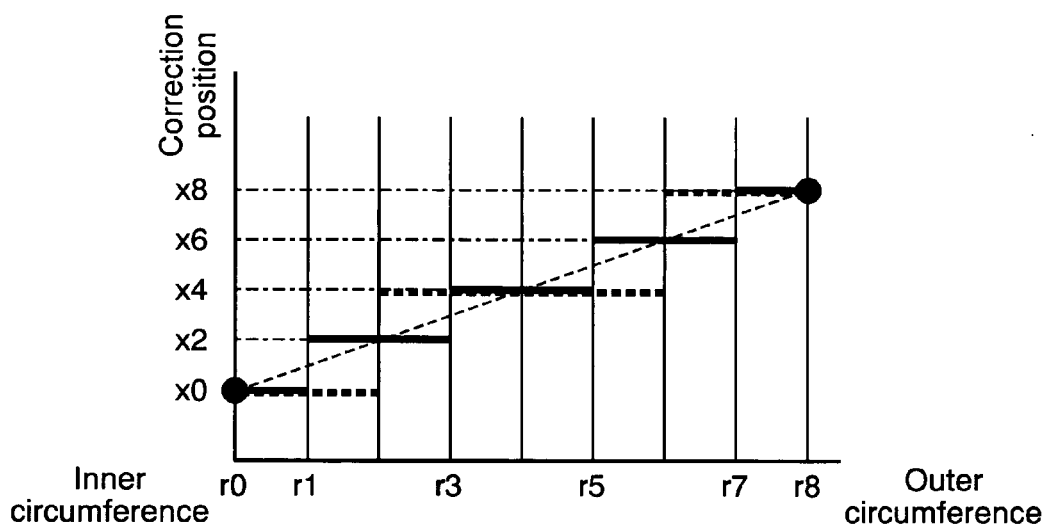
FIGS. 7A and 7B are diagrams showing spherical aberrations correction in read/write operation.
Figure 7:
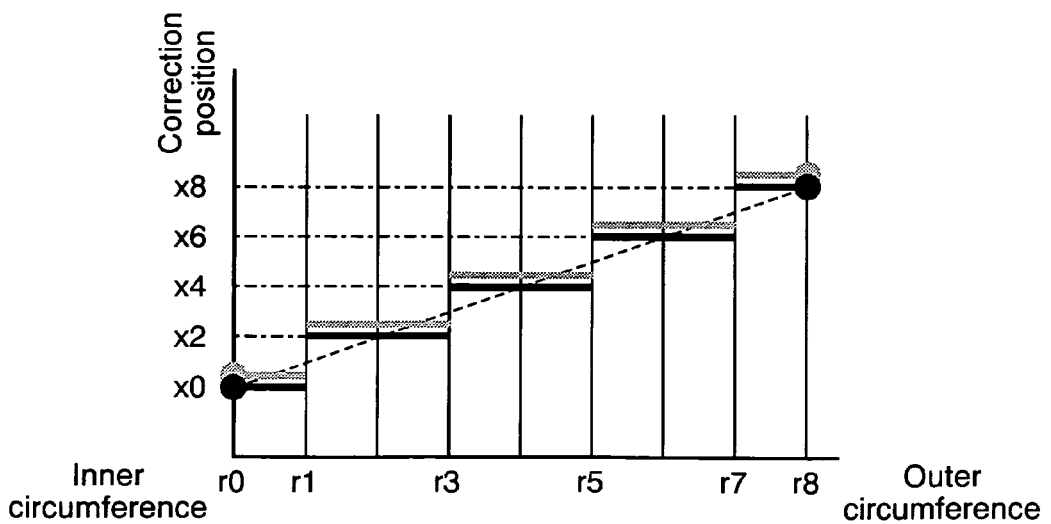

The present embodiment performs spherical aberrations correction according to the radius information of the disc by use of the same value both for reading and writing, but the present invention is not limited thereto. Specifically, when the write performance margin or read performance margin against variation in disc substrate thickness is different, it would be possible to set a spherical aberrations correction value as shown by solid lines in recording and dotted lines in writing, as shown in FIG. 7A. In this case, reading for verification is based on the spherical aberrations correction position in writing. Further, as shown in FIG. 7B, it would be possible to set a spherical aberrations correction position according to operating conditions by detecting and interpolating the spherical aberrations correction position at disc radius positions r0 and r8 independently for each of writing and reading.

As mentioned above, by independently setting a radius position for changing the amount of spherical aberrations correction according to the moving direction of the focal spot and allowing the amount of spherical aberrations correction with respect to the radius position to draw a hysteresis loop, spherical aberrations caused by disc substrate thickness error can be corrected without degrading the operability, thus realizing the reliability of the apparatus.

While we have shown and described several embodiments in accordance with our invention, it should be understood that disclosed embodiments are susceptible to changes and modifications without departing from the scope of the invention. Therefore, we do not intend to be bound by the details shown and described herein but intend to cover all such changes and modifications as fall within the ambit of the appended claims.

What is claimed is:

1. An optical disc drive, comprising:
   an objective lens which focuses laser light onto a disc,
   a focus actuator which adjusts the position of the objective lens in the rotating axis direction of the disc,
   a tracking actuator which adjusts the position of the objective lens in the radial direction of the disc;
   an aberrations correction module which corrects spherical aberrations of the focal spot focused onto the disc by the objective lens; and
   a detecting module which detects information about the disc radius position of the focal spot;
   wherein the correction module sets an amount of spherical aberrations correction for each of a plurality of zones associated with the disc radius;
   wherein a change position for spherical aberrations correction is set to one of two different values depending on whether the focal spot moves from inner to outer circumference of the disc or vice versa;
   wherein the correction module changes the amount of spherical aberration correction to one of the two different values from the other one of the two different values when the focal spot is moving outwardly in the radial direction and exceeds a radial position PA1$p$;
   wherein the correction module changes the amount of spherical aberration correction to the other one of the two different values from one of the two different values when the focal spot is moving inwardly in the radial direction and becomes less than the radial position PA1$n$;
   wherein PA1$p$ and PA1$n$ are radial positions on the disc and the PA1$p$ radial position is further from the disc's center than the PA1$n$ radial position; and
   wherein a radial distance between PA1$p$ and PA1$n$ is larger than a radial distance that the focal-spot traverses when verifying data on the disc.

2. The optical disc drive according to claim 1,
   wherein, when the focal spot reaches a change position of the amount of spherical aberrations correction during write operation, the aberrations correction module sets an amount of spherical aberrations correction after the write operation is stopped, and
   wherein the aberrations correction module sets an amount of spherical aberrations correction during seek operation or before write operation thereafter when the zone changes by seek operation and write operation is performed thereafter.

3. The optical disc drive according to claim 1,
wherein the aberrations correction module sets an amount of spherical aberrations correction independently of a read process during a read operation when the spot reaches a change position of the amount of spherical aberrations correction during read operation, and
wherein the aberrations correction module sets an amount of spherical aberrations correction during seek operation or before read operation thereafter when the zone changes by seek operation and read operation is performed thereafter.

4. The optical disc drive according to claim 1, wherein the aberrations correction module sets an amount of spherical aberrations correction if an error occurs in read operation or address reading when the spot reaches a change position of the amount of spherical aberrations correction during read operation or address reading.

5. The optical disc drive according to claim 1, wherein the radius information detecting module detects a disc radius position of the focal spot based on at least one of pieces of information on disc physical address, moving distance of the seek motor, and target address for seek.

6. The optical disc drive according to claim 2, wherein the radius information detecting module detects a disc radius position of the focal spot based on at least one of pieces of information on disc physical address, moving distance of the seek motor, and target address for seek.

7. The optical disc drive according to claim 1, wherein the aberrations correction module determines whether or not the amount of spherical aberrations correction is changed based on an output of the radius information detecting module and the zone information in response to a writing speed or reading speed.

8. The optical disc drive according to claim 2, wherein the aberrations correction module determines whether or not the amount of spherical aberrations correction is changed based on an output of the radius information detecting module and the zone information in response to a writing speed or reading speed.

* * * * *